No. 824,602. PATENTED JUNE 26, 1906.
H. J. TATE.
COTTON GIN.
APPLICATION FILED JULY 18, 1905.
4 SHEETS—SHEET 1.
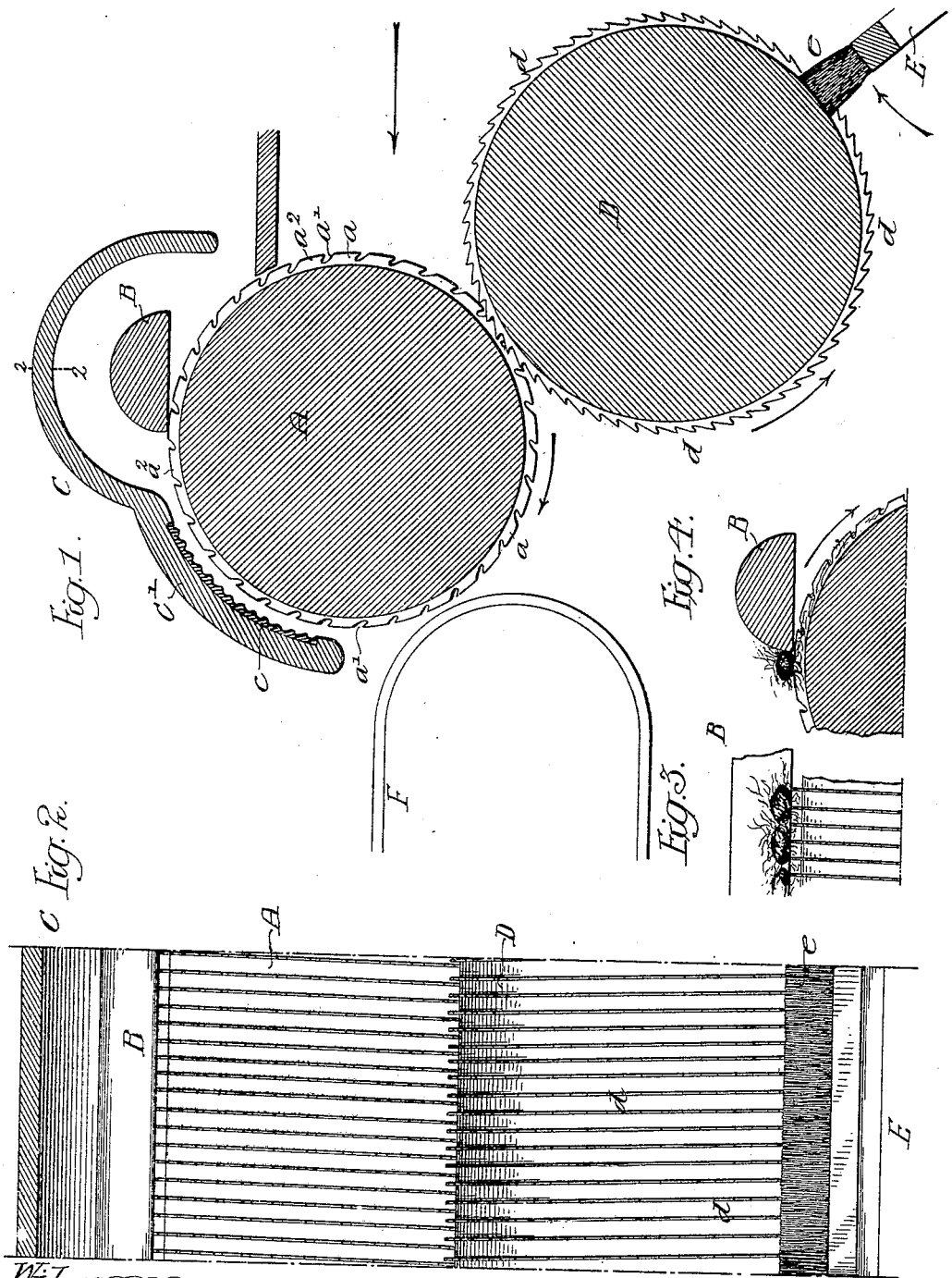
Witnesses:
Titus H. Ives.
Hamilton S. Turner
Inventor:
Hugh J. Tate.
by his Attorneys,
Howson & Howson

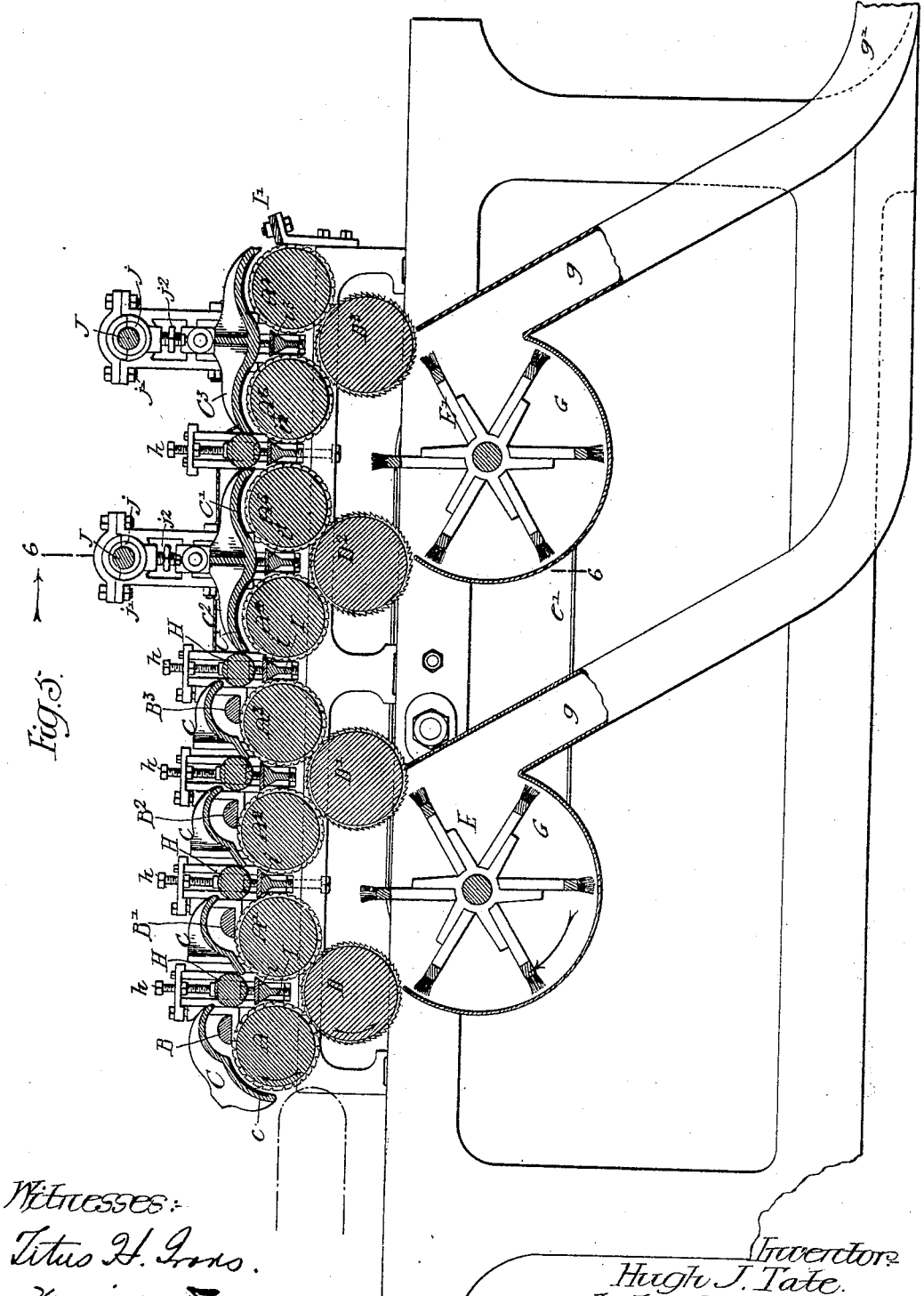

No. 824,602. PATENTED JUNE 26, 1906.
H. J. TATE.
COTTON GIN.
APPLICATION FILED JULY 18, 1905.
4 SHEETS—SHEET 3.
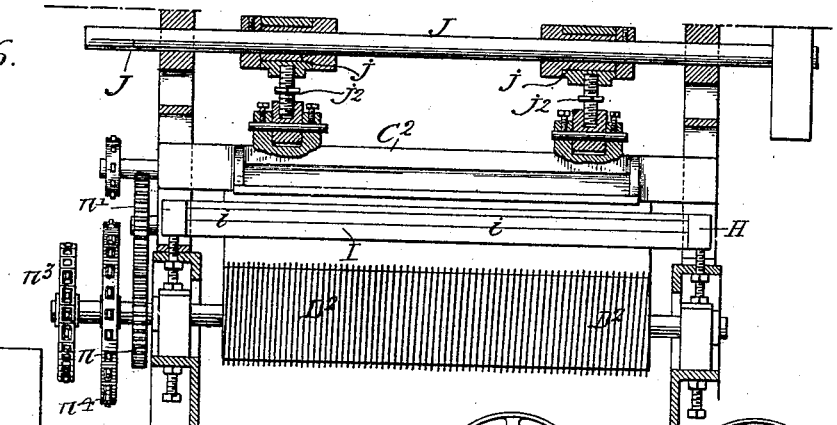
Fig. 6.
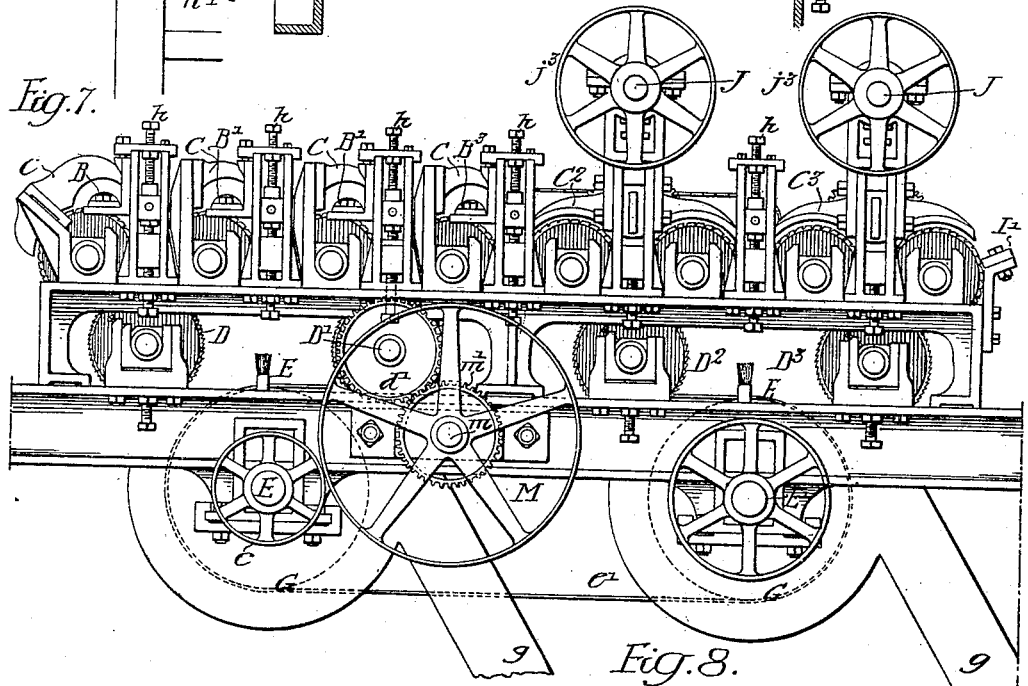
Fig. 7.
Fig. 8.
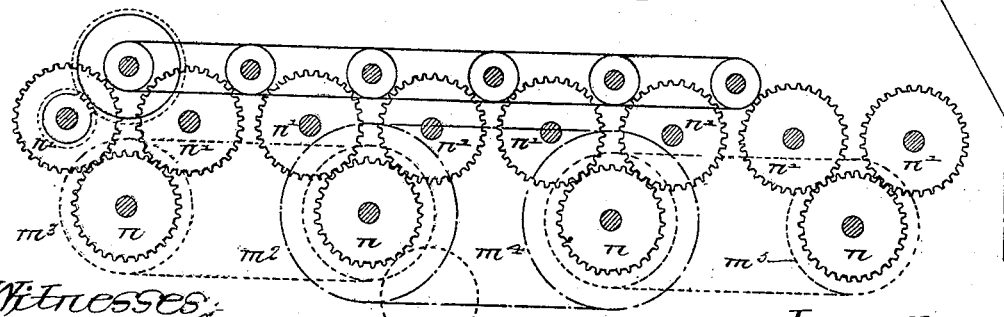
Witnesses:
Titus H. Irons.
Hamilton D. Turner
Inventor:
Hugh J. Tate.
by his Attorneys,
Howson & Howson No. 824,602. PATENTED JUNE 26, 1906.
H. J. TATE.
COTTON GIN.
APPLICATION FILED JULY 18, 1905.
4 SHEETS—SHEET 4.
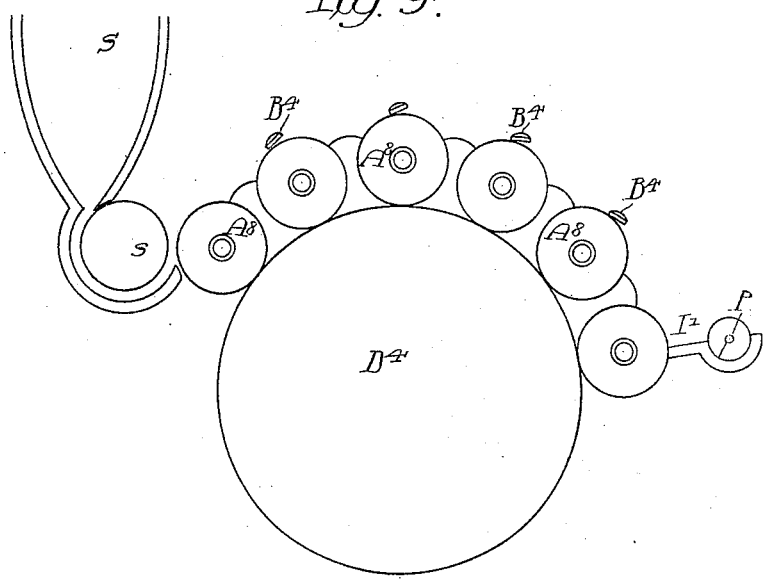
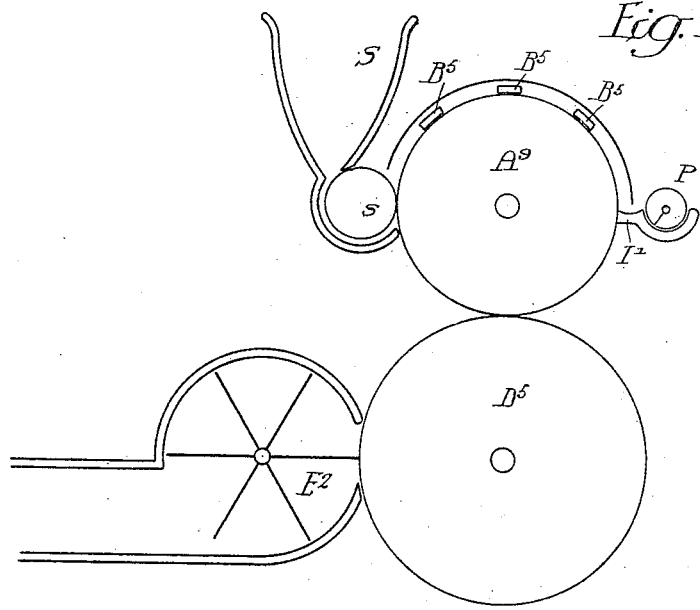
Witnesses:
Inventor:
Hugh J. Tate.
by his Attorneys,
Howson & Howson

UNITED STATES PATENT OFFICE.

HUGH J. TATE, OF PHILADELPHIA, PENNSYLVANIA, ASSIGNOR OF TWO-NINTHS TO STANLEY G. MILLER, OF PHILADELPHIA, PENNSYLVANIA, TWO-NINTHS TO EDWIN HOWARD, OF CHARLOTTE, NORTH CAROLINA, AND TWO-NINTHS TO JAMES A. FERGUSON, OF PHILADELPHIA, PENNSYLVANIA.

COTTON-GIN.

No. 824,602.     Specification of Letters Patent.     Patented June 26, 1906.

Application filed July 18, 1905. Serial No. 270,203.

*To all whom it may concern:*

Be it known that I, HUGH J. TATE, a citizen of the United States, residing in Philadelphia, Pennsylvania, have invented certain Improvements in Cotton-Gins, of which the following is a specification.

My invention relates to certain improvements in machines for ginning cotton.

One object of my invention is to construct a machine which will thoroughly and rapidly remove the cotton from the seed and separate the seed from the cotton so removed.

A further object of my invention is to provide a machine which will progressively act upon the seed as it passes from one set of mechanism to another, as fully described hereinafter.

In cotton-gins of the usual "saw" type it has been customary to space the saws a sufficient distance apart to allow the seeds to enter the spaces between the saws, the saws removing the cotton from each side of the seed while it is in the space between the saws.

The main feature of my invention is to so construct the machine that the seeds do not enter the spaces but ride upon the teeth, the teeth removing the cotton from the seed as the teeth pass under the seeds. The seeds are prevented from rotating with the toothed roll by an abutment, and the action of the toothed roll will cause the seeds to turn or roll against the abutment, so as to present new surfaces to the action of the teeth until finally the cotton has been entirely removed from the seed.

In the accompanying drawings, Figure 1 is a sectional view through the ginning-roll, the abutment, and the doffing-roll to illustrate my invention. Fig. 2 is a view looking in the direction of the arrow, Fig. 1, with the guard-plate in section on the line 2 2. Figs. 3 and 4 are diagram views showing the position of the seeds in respect to the ginning-roll. Fig. 5 is a longitudinal sectional view through a complete machine, illustrating my invention. Fig. 6 is a section on the line 6 6, Fig. 5, with the ginning-roll removed. Fig. 7 is a side view. Fig. 8 is a diagram view illustrating the gearing, and Figs. 9 and 10 are diagram views illustrating modifications of my invention.

Referring in the first instance to Figs. 1 to 4, inclusive, A is a roll on which is spirally arranged a toothed metallic strip $a$. The teeth are formed as clearly shown in Fig. 1, and the strip is wound spirally on the roll A, the convolutions being so spaced that the cotton-seeds cannot pass into the space between the convolutions, but must ride upon the teeth, distinguishing this machine from the machines now in common use. It will be noticed in referring to Figs. 1 to 4 that the teeth of the strip are formed by notching the strip and so that the points $a'$ do not project beyond the bodies $a^2$ of the teeth, there being a flat surface back of each tooth, upon which the seeds ride, so that there is no liability of the point of the tooth engaging the seed. The points, however, will pass in close proximity to the seed and remove from it any adhering cotton. B is an abutment mounted above the roll A in the present instance and so situated that the teeth will pass directly under the forward edge thereof, so that the seed from which the cotton is to be removed will be rolled against the forward edge of the abutment by the action of the spirally-arranged teeth, causing the seed to present new surfaces to the action of the teeth, the seeds finally passing over the abutment clear of the machine. D is a doffing-roll having a spirally-arranged toothed strip $d$ mounted thereon. The teeth of this strip are like saw-teeth, as indicated in Fig. 1. The toothed strip $d$ is wound spirally on the roll D in a direction opposite to the winding of the toothed strip $a$ on the roll A, and the parts are so proportioned that the teeth $d$ enter the spaces between the teeth $a$ of the roll A, removing the adhering cotton from the teeth $a$. E is a brush the bristles $e$ of which remove the cotton from the teeth $d$ of the roll D. Above the roll A and the abutment B is a guard-plate C. This guard-plate has an extension C', in which is embedded in the present instance a ribbed rubber plate $c$. The ribs of this plate run longitudinally in respect to the roll, and the plate is a sufficient distance from the roll to allow for the free passage of the seed with the cotton attached from the feed-belt F to the abutment B. It will be understood that the cotton-seeds can be fed either from the belt or from a hopper to the roll A and are carried by the teeth of the roll under the portion C' of the guard-plate C, the ribbed rubber surface causing the seeds to turn, and the teeth will remove a portion of the cotton from the seeds at this point. The seeds will accumulate along the edge of the abutment B, and owing to the spiral arrangement of the teeth the seeds will travel along the abutment, as indicated in Fig. 3, and presenting new surfaces for the teeth to act upon. As the seeds accumulate on the abutment some of them will pass over the abutment and escape clear of the toothed roll A, while the cotton is carried around with the roll and removed from the roll by the toothed doffing-roll B, and the cotton is then removed from this doffing-roll by the rapidly-rotating brush E. While in some cases the above-described mechanism will be sufficient, it will be understood that it can be duplicated as many times as desired, so that the seeds will pass from one set of mechanism to another, and so on until they are entirely denuded of cotton.

In Figs. 5, 6, and 7 I have illustrated a complete machine for successively acting upon the seeds. A to $A^7$ are a series of toothed rolls having teeth similar to the teeth illustrated in the roll A, Fig. 1. D D' $D^2$ $D^3$ are a series of doffing-rolls having teeth similar to the doffing-roll illustrated at D, Fig. 1. The teeth of the doffing-roll D enter the spaces between the teeth of the rolls A and A', so as to remove the cotton from both these rolls, while the doffing-roll D' enters the spaces between the teeth of the rolls $A^2$ and $A^3$, removing cotton from both these rolls, and the roll $D^2$ is the doffing-roll for the rolls $A^4$ and $A^5$, while the roll $D^3$ is the doffing-roll for the rolls $A^6$ and $A^7$. In this construction there are two rapidly-rotating brushes E and E'. The brush E is so situated as to remove the cotton from the doffing-rolls D and D', and the brush E' is so situated as to remove the cotton from the doffing-rolls $D^2$ and $D^3$. The brushes E and E' are each mounted in a casing G, having a discharge-passage $g$, which communicates with a common discharge-passage $g'$. The rotation of the brushes will cause the cotton to escape through these passages $g$ $g'$, and if the cotton is to be carried to any distance suction-fans may be connected to the discharge-passages for the purpose of entirely removing the cotton as it enters the passages. Above the rolls A A' $A^2$ $A^3$ are abutments B B' $B^2$ $B^3$, respectively, and between the rolls are plates $i$, which are so adjusted as to come in close proximity to the teeth of the rolls. These plates are mounted on transverse bars I. (Clearly shown in Fig. 5.) Above the plates $i$ are rollers H, which can be adjusted vertically by adjusting-screws $h$ $h'$, the rolls being mounted in suitable boxes carried by the frame of the machine. The guard-plates C are mounted above the several rolls and abutments, as shown, the first guard-plate having a ribbed rubber surface $c$, similar to the rubber surface illustrated in Fig. 1; but the extensions of the other guard-plates are short, terminating in close proximity to the rolls H and simply act as guides to direct the seeds from one set of mechanism to another, as clearly illustrated in the drawings. In the present instance the abutments do not extend beyond the fourth roll, and above the rolls $A^4$ and $A^5$ is a guard-plate $C^2$, having rubber surfaces $c'$, which extend over the two rolls, and I preferably provide means for moving the guard-plate $C^2$ toward and from the rolls, so as to force the seeds against the surfaces of the teeth of the rolls $A^4$ and $A^5$. This mechanism is constructed as follows in the present instance: J is a transverse shaft mounted in suitable bearings, and on this shaft are two eccentrics $j$ $j$, around each of which passes a strap $j'$, connected to the guard-plate $C^2$ by a link-rod $j^2$. This rod is screw-threaded at both ends, so that it can be adjusted. By this means the guard-plate can be adjusted toward and from the rollers $A^4$ and $A^5$. As motion is imparted to the shaft J the eccentrics thereon will cause the guard-plate to move to and from the rolls. Mounted between the two rolls $A^4$ and $A^5$ is a plate $i'$, similar to the plate $i$, for transferring the seeds from one roll to the other. There is also a plate $i^2$ between the rolls $A^5$ and $A^6$ and another plate $i^3$ between the rolls $A^6$ and $A^7$. There is a guard-plate $C^3$ extending over both of the rolls $A^6$ and $A^7$, similar to the guard-plate $C^2$, and there is also mechanism for imparting motion to this guard-plate, similar in construction to that illustrated in connection with the rolls $A^4$ and $A^5$. I' is a stripping-bar at the extreme end of the machine, which removes the seeds from the last roll $A^7$. The seeds can fall into any convenient receptacle, and when at this point they are free from adhering fiber and practically clean. As the ginning-rolls and doffing-rolls must have the same axial speed, I gear each doffing-roll to the two ginning-rolls, from which it strips the cotton, all the gears being of the same diameter; but as the doffing-roll is slightly greater in diameter than the ginning-rolls its surface speed will be faster than the surface speed of the ginning-rolls. Consequently the cotton will be more readily stripped from the ginning-rolls than where the rolls are all of the same size, although in some instances I may make the machine with the rolls all of the same diameter. Thus it will be seen that each set of two ginning-rolls and one doffing-roll are independently driven. In the present instance M is a driven wheel mounted on a stud $m$, and on this wheel is a gear $m'$, which meshes with the gear-wheel $d'$ on the spindle of the roll $D'$. This roll has two sprocket-wheels $m^2$, around which pass drive-chains, one to a sprocket-wheel $m^3$ on the spindle of the roll D and the other to a sprocket-wheel $m^4$ on the spindle of the roll $D^2$. There is a second sprocket-wheel on the roll $D^2$, around which passes a chain from a sprocket-wheel $m^5$ on the roll $D^3$. The sprocket-wheels may be of different diameters, if desired, so as to drive the rolls at different speeds.

As illustrated in Fig. 8, each doffing-roll has a gear-wheel $n$, which meshes with gear-wheels $n'$ of the same diameter on the two ginning-rolls from which it strips the cotton. The small rollers H each have a sprocket-wheel, and the first roller is driven from the ginning-roll A by gearing, and this roller in turn drives the other rolls by chains running from one roll to the other, as indicated in Fig. 8. On one end of the shaft of the forward brush E is a pulley $e$, around which passes a driving-belt, and on the opposite end of the shaft is a pulley around which passes a belt $e'$ to a pulley on the shaft of the brush $E'$. On the two shafts J J are pulleys $j^3$, around both of which passes a belt from a pulley $e^2$ on the shaft of the brush $E'$. The above simply describes one method of driving my improved cotton-gin; but it will be readily understood that it can be driven in any suitable manner without departing from my invention.

In Fig. 9 I have shown a modification of my invention in which a single doffing-roll $D^4$ removes the cotton from all of the ginning-rolls $A^3$. In this instance I have shown a feed-hopper S with a toothed feed-roll $s$, and at the opposite end of the machine I have shown a screw P for transferring the seeds to one side of the machine. The abutment-plates $B^4$ are arranged in a manner similar to that shown in Fig. 5.

In Fig. 10 I have shown another modification in which there is a single large ginning-wheel, and mounted in a circular frame over this wheel is a series of abutment-plates $B^5$, and there is a doffing-roll $D^6$ and a brush $E^2$. The two views Figs. 9 and 10 are shown in diagram simply to illustrate the fact that modifications of the general arrangement of the mechanism can be made without departing from the essential features of the invention.

I claim as my invention—

1. The combination in a cotton-gin, of an abutment, an element arranged to pass under the abutment and provided with rows of teeth, the space between each row of teeth being such that the seeds cannot enter the spaces between said rows but will ride upon the teeth and against the abutment, substantially as described.

2. The combination in a cotton-gin, of a fixed abutment, a roll rotating in close proximity to the said abutment, and rows of teeth on said roll, the rows of teeth being so spaced that the seeds cannot enter the spaces between the teeth but will ride upon the teeth and against the abutment, substantially as described.

3. The combination in a cotton-gin, of a fixed abutment, a roll rotating in close proximity to the abutment, said roll having teeth thereon formed of flat blades spirally wound upon the roll, the space between the convolutions of the spiral being less than the width of the seeds so that the seeds will ride upon the teeth and against the abutment and travel longitudinally along the face of the abutment, substantially as described.

4. The combination in a cotton-gin, of an abutment of a given height so that the seeds will finally pass over the abutment, a ginning-roll having a series of teeth, said roll being mounted directly under the abutment so that the seeds will ride upon the teeth while the fiber is being removed from them and will finally pass over the abutment, substantially as described.

5. The combination in a cotton-gin, of a fixed abutment, a roll mounted in close proximity to the abutment, said roll having teeth made from a toothed strip wound spirally upon the roll, with a toothed doffer having its teeth wound spirally and the teeth of the doffer entering the spaces between the teeth of the adjoining roll, substantially as described.

6. The combination of a series of abutments, a ginning-roll mounted close to each abutment, each ginning-roll having a series of teeth, the spaces between the teeth being less in width than the seeds, means for driving the rolls so that as the cotton is fed to the first roll it will come in contact with the first abutment and the seed will ride over the abutment and come in contact with the second abutment and the second roll and so on, substantially as described.

7. The combination of a series of abutments, ginning-rolls mounted close to the abutments, each ginning-roll having a series of teeth, the spaces between the teeth being less in width than the seeds, means for driving the rolls so that as the cotton is fed to the first roll it will come in contact with the first abutment and the seed will ride over the abutment and come in contact with the second abutment and the second roll and so on, the teeth of the several rolls being spaced different distances apart, substantially as described.

8. The combination in a cotton-gin of two toothed rolls, a plate mounted between them, means for removing the cotton from these rolls, a guard mounted above the rolls, and means for moving the guard toward and from the rolls, substantially as described.

9. The combination in a cotton-gin of a pair of toothed rolls, means for removing cotton from the rolls, a plate mounted between the two rolls, a plate mounted over the rolls, guides for the latter plate, a shaft, eccentrics on the shaft, and eccentric-rods connected to the plate so that as the shaft revolves the plate will be moved toward and from the rolls, substantially as described.

10. The combination in a cotton-gin of a toothed roll, means for removing cotton from the roll, an abutment for the seeds, a guard-plate mounted over the rolls, and a ribbed sheet of yielding material set in the guard, substantially as described.

11. The combination of a toothed roll, means for moving the cotton from the said roll, an abutment against which the seeds rest, a guard mounted above the roll and abutment, a sheet of rubber mounted in a portion of the said guard in close proximity to the roll, said sheet of rubber having a roughened face, substantially as described.

12. The combination of a series of toothed rolls, an abutment above each roll, a guard above each roll and abutment, a plate mounted between the rolls, and a roller mounted above said plate and between the guards, and means for removing cotton from the toothed roll, substantially as described.

13. The combination of a series of toothed rolls, an abutment mounted above the rolls, guards mounted above the rolls and abutment, plates mounted between the rolls, rollers above the plates and between the guards, a doffing-roll for removing cotton from the toothed rolls, a second series of toothed rolls, doffing-rolls for removing cotton from the second series, guard-plates mounted above the said rolls, said guard-plates being arranged in pairs, means for moving the guard-plates toward and from the said rolls, and plates mounted between the said rolls and a plate at the rear of the machine for removing the seeds from the last roll, substantially as described.

14. The combination in a cotton-gin of a series of toothed rolls, abutments mounted above the said rolls, doffing-rolls engaging the said toothed rolls, brushes arranged to remove the cotton from the doffing-rolls, a casing for the said brushes, and a pipe leading from the brushes, substantially as described.

15. The combination in a cotton-gin of an abutment, a toothed ginning-roll arranged under the abutment, a doffing-roll for said ginning-roll, means for feeding cotton to the gin, and means for collecting the seeds after the cotton has been removed therefrom, and a device for carrying the seeds transversely from the machine, substantially as described.

16. The combination in a cotton-gin of a toothed ginning-roll, and a toothed doffing-roll, greater in diameter than the ginning-roll, the teeth of the doffing-roll entering the space between the teeth of the ginning-roll, both rolls having the same axial speed but the surface speed of the doffing-roll being greater than the surface speed of the ginning-roll, substantially as described.

17. The combination in a cotton-gin of a ginning-roll having a toothed strip wound spirally thereon, a doffing-roll greater in diameter than the ginning-roll, and also having a toothed strip wound spirally thereon, but in a reverse direction to the strip of the ginning-roll, the toothed strip of the doffing-roll entering the spaces between the convolutions of the strip of the ginning-roll, both rolls having the same axial speed and the doffing-roll having a greater surface speed than the ginning-roll, substantially as described.

In testimony whereof I have signed my name to this specification in the presence of two subscribing witnesses.

HUGH J. TATE.

Witnesses:
E. R. LOUGHERY,
JOS. H. KLEIN.